United States Patent [19]

Lynnes et al.

[11] 4,397,371
[45] Aug. 9, 1983

[54] LOADER OPERATOR RESTRAINT SYSTEM

[75] Inventors: Carman P. Lynnes, Leonard; Eugene J. Kielb; Joseph M. Mather, both of Lisbon; Larry E. Albright; Lonnie D. Hoechst, both of Gwinner, all of N. Dak.

[73] Assignee: Clark Equipment Company, Buchanan, Mich.

[21] Appl. No.: 228,536

[22] Filed: Jan. 26, 1981

[51] Int. Cl.³ .............................................. B60R 21/10
[52] U.S. Cl. .................................... 180/271; 180/269; 192/129 R; 280/751; 414/699
[58] Field of Search ....................... 180/6.48, 271, 272, 180/273, 268, 269, 287, 286; 280/751, 748, 753; 296/152, 153, 84 K; 192/129 R; 414/699

[56] References Cited

U.S. PATENT DOCUMENTS

| | | | |
|---|---|---|---|
| 3,133,746 | 5/1964 | Zazzara | 280/753 |
| 3,431,995 | 3/1969 | Kiernan | 180/268 |
| 3,494,633 | 2/1970 | Malloy | 296/84 K |
| 3,640,572 | 2/1972 | Doehler | 280/751 |
| 3,666,033 | 5/1972 | Haug | 180/6.48 |
| 3,799,572 | 3/1974 | Hollins | 296/84 K |
| 3,993,157 | 11/1976 | Schulte | 180/286 |
| 4,063,832 | 12/1977 | Bauer et al. | 403/54 |
| 4,122,960 | 10/1978 | Bauer et al. | 214/140 |
| 4,260,320 | 4/1981 | Steiger | 414/680 |

OTHER PUBLICATIONS

"Bobcat Loader 533, 631, 731 Europe Export Kit" brochure, Reference No. 6561016 dated 8/80 consisting of 8 pages.
"Bobcat Loader 310, 313 Europe Export Kit" brochure, Reference No. 6561041, undated and consisting of 9 pages.
"HMI Hydra-Mac, Inc. Model 14C" advertisement, undated and consisting of 2 pages.

Primary Examiner—David M. Mitchell
Attorney, Agent, or Firm—Mack L. Thomas; Harry G Thibault

[57] ABSTRACT

A front end loader in the form of a skid-steer loader which includes a power operated working implement and control apparatus that has a plurality of operative positions for supplying power to the working implement and at least one neutral position where power cannot be supplied to the working implement. The control apparatus is capable of being manipulated by the operator of the loader to place the control apparatus in any one of the selected operative positions or the neutral position. An operator restraint member is mounted on the skid-steer loader and has an engaged position for securing the operator to the operator position during operation of the loader and a disengaged position to permit the operator to enter or leave the loader. A locking member is engaged with the control apparatus when the restraint member is in its disengaged position and is disengaged from the control apparatus when the restraint member is in its engaged position.

13 Claims, 5 Drawing Figures

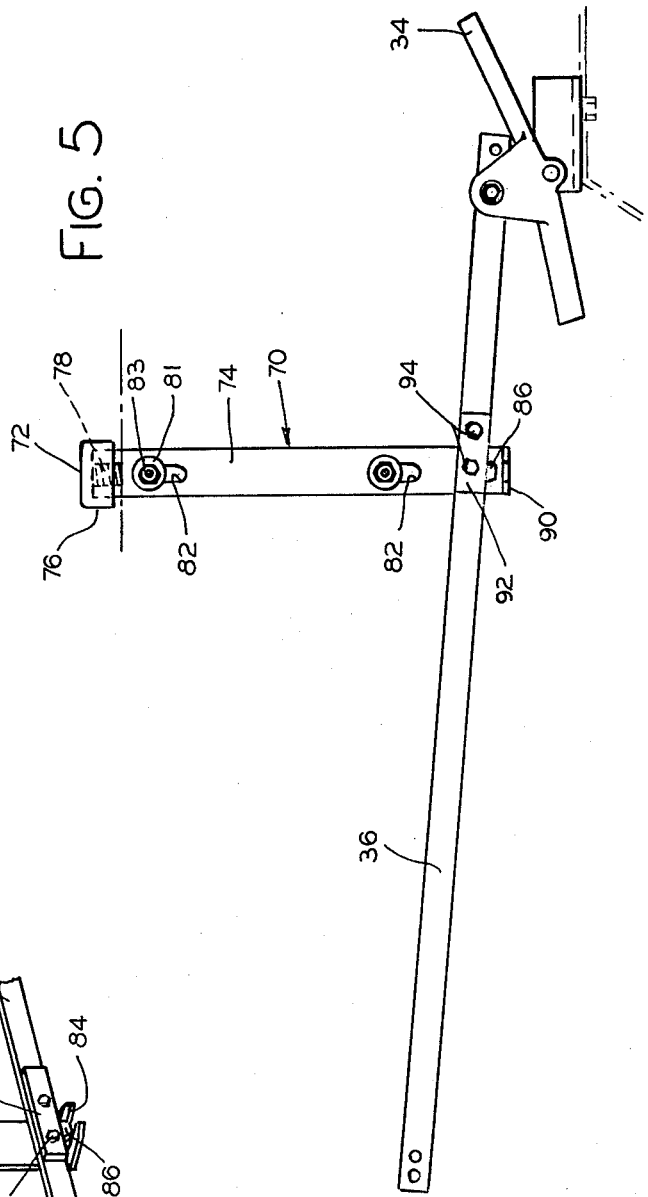
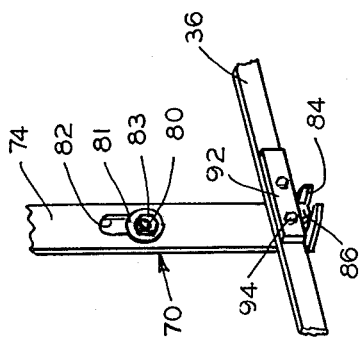
FIG. 5
FIG. 4

4,397,371

LOADER OPERATOR RESTRAINT SYSTEM

CROSS REFERENCES

U.S. patent applications filed simultaneously herewith, one in the names of Michael A. Vig et al entitled "Operator Restraint for a Loader", Ser. No. 228,535, filed Jan. 26, 1981, and the other in the names of Henry J. Weber et al entitled "Loader Operator Restraint", Ser. No. 228,534, filed Jan. 26, 1981, both assigned to the Assignee of the present invention.

BACKGROUND OF THE INVENTION

1. Field of the Invention

The field of art to which this invention pertains includes front end loaders and more specifically to safety features for front end loaders.

2. Description of the Prior Art

Front end loaders often include a cab portion having an operator seat from which the loader is operated and from which the operator can control the various functions of the loader. Some types of front end loaders are expected to go over rough terrain, make sudden stops and turns and are subject to sudden tilting and lurching. Roll Over Protection Structures (ROPS) and/or seat belts are customarily provided to lower the possibility of injury during the above-described rough ride conditions. It is preferable that the operator use his seat belt under these conditions to avoid an enhanced possibility of injury or being thrown from the vehicle.

A skid-steer loader is a type of front end loader in which the operator often encounters rough ride conditions. Skid-steer loaders are commonly provided with a front entry Roll Over Protection Structure (ROPS) and a seat belt.

In Hydra-Mac, Inc.'s skid-steer loader the front entry is provided with a two section gate that has a closed position for blocking the front entry and an open position where the gate sections act as obstructions in the path of the boom arms. It should be noted that the operator in this loader is prevented from being thrown from the cab portion when the gate is in its closed position but is not prevented from undue movement in the cab portion during rough ride conditions.

Another known prior art safety feature provided on skidster loaders is manufactured by the Assignee of the present invention and includes two types of manually actuated mechanical locks on the foot pedal linkage controlling the boom arms. Both of these mechanical locks are not connected with any other safety feature.

SUMMARY OF THE INVENTION

This invention provides safety apparatus that has a lower position that not only blocks the front entry of the front end loader but also maintains the operator in his seat and the cab during rough ride conditions. Moreover, the safety apparatus has a raised position wherein the operator is prevented from operating the hydraulics to raise or lower the boom arms or tilt the bucket of the loader. Therefore, the operator must place the safety apparatus in its lower position in order to raise or lower the boom arms or tilt the bucket of the loader.

The safety apparatus includes a seat bar which is pivotally connected at each of its two ends to the loader at either vertical side posts of the front opening of the cab portion of the loader. The seat bar rotates about a horizontal axis defined by the axially aligned connection points for the seat bar on the side posts. When the seat bar is in its lower position the middle portion of the seat bar holds and retains the operator in the cab seat and prevents undue operator movement during rough ride conditions. When the seat bar is in its raised position operator entrance and egress is permitted from the front opening of the loader.

A pair of locking members is provided on opposite sides of the loader. The lower end of one of the locking members is in selective engagement with a boom arm control linkage which operates between a foot pedal and the hydraulic control for the boom arms to lock the boom arm control linkage in a neutral position. The lower end of the locking member of the opposite side of the vehicle is in engagement with a bucket control linkage operating between a second foot pedal and hydraulic controls for tilting the bucket to lock the bucket control linkage in a neutral position. The locking members are operatively associated with the seat bar and are moved out of locking engagement with respective control linkages when the seat bar is in its lowered position.

The cab portion of the vehicle can be tilted up and lifted away from the frame portion of the vehicle to permit ease of servicing of drive components contained in the vehicle frame. The seat bar is mounted on the cab portion of the loader and the locking members are mounted on the frame of the vehicle so that the seat bar moves with the cab portion when it is tilted up and away from the frame.

DESCRIPTION OF THE DRAWINGS

FIG. 4 is a detail view of the lower end of the locking member and its associated control linkage shown in FIG. 1; and FIG. 5 is an enlarged detail side view of the locking member and control linkage shown in FIG. 1.

DETAILED DESCRIPTION OF THE PREFERRED EMBODIMENT

Figure 1:
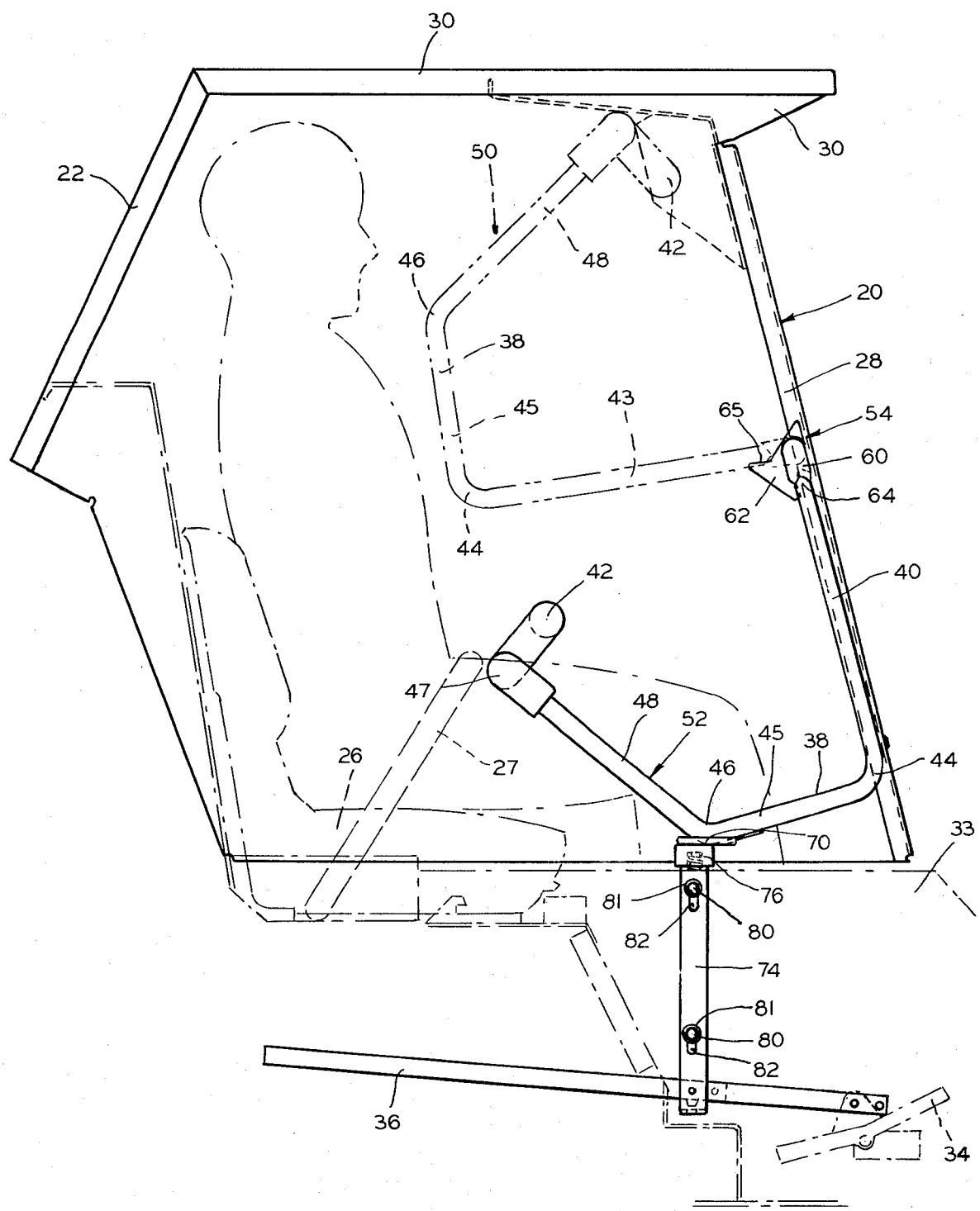
FIG. 1 is a side view of the cab portion of a skid-steer loader provided with the improvements of the present invention.
Figure 2:
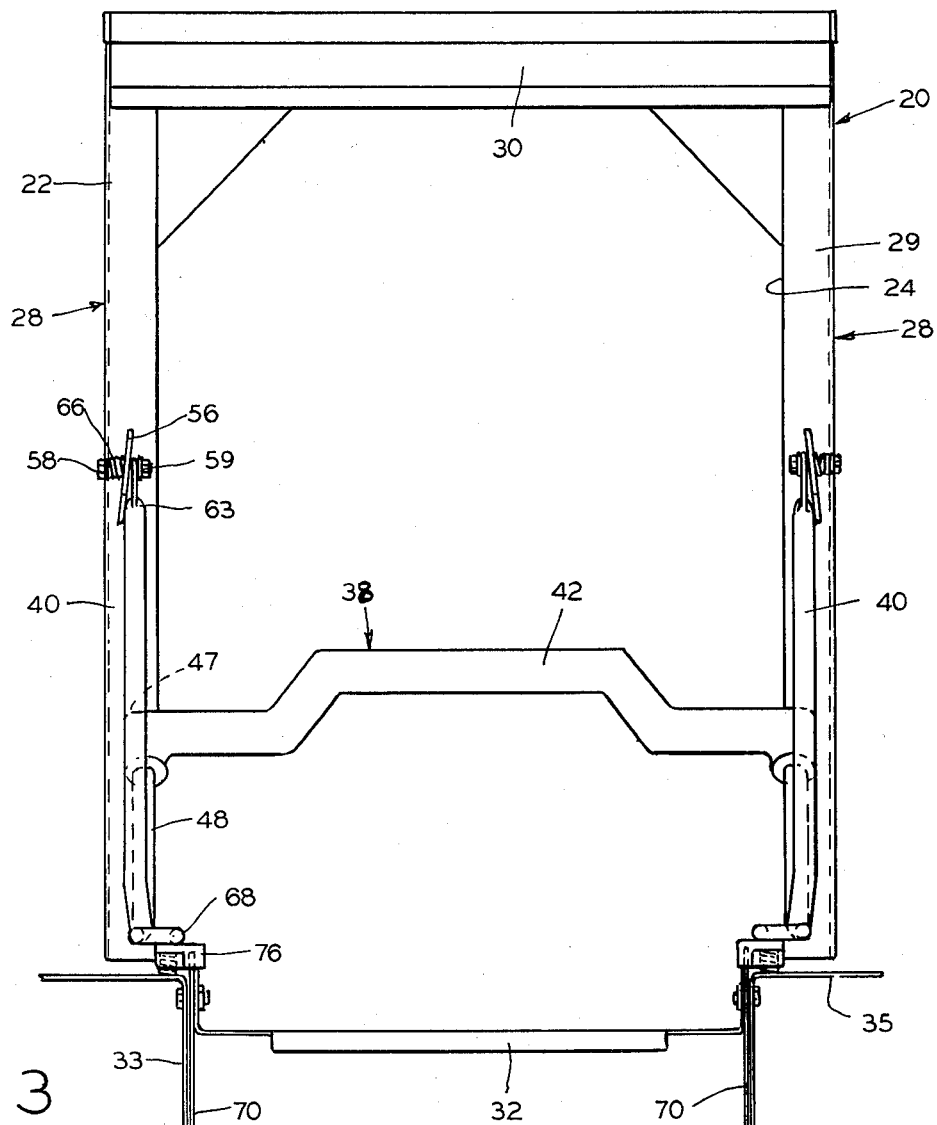
FIG. 2 is a front view of the cab portion of a skid-steer loader illustrated in FIG. 1.

A front end loader illustrated in this embodiment as a skid-steer loader 20 is shown in FIGS. 1 and 2. The skid-steer loader 20 includes a Roll Over Protection Structure (ROPS) 22 provided with a front entry and egress opening 24. The ROPS also serves as the cab portion of the skid-steer loader 20. An operator seat 26 is provided inside the cab portion 20 and has a seat belt 27. The front entry 24 is bounded on each vertical side by a side post 28, at the top by roof portion 30, and at the bottom by the upper edge of front plate 32 of frame 33 of the skid-steer loader 20. Each of the side posts 28 is comprised of a plurality of side walls 29.

Skid-steer loader 20 also includes a pair of conventional foot pedals 34 and associated control linkages 36. One of the control linkages 36 operates between the foot pedal and the hydraulic control (not shown) for supplying hydraulic fluid to raise and lower the boom arms in the conventional fashion. The other foot pedal 34 is connected to its associated control linkage 36 which operates between the foot pedal and hydraulic control (also not shown) for controlling the inclination or tilt of the bucket (not shown) of the skid-steer loader 20. The control linkages 36 as shown in detail in FIGS. 4 and 5 are more fully discussed in U.S. Pat. Nos. 4,063,832 and 4,122,960, both assigned to the Assignee of the present invention. However, it should be briefly noted that the foot pedals 34 and associated control linkages 36 return to a neutral position when the foot pedal is not being depressed by the foot of the operator all in a manner well known in the prior art. A bracket 92 is mounted to each of the conventional control linkages 36 by fasteners 94. The bracket 92 includes a downwardly directed projection 86 whose purpose will be discussed in greater detail below.

A seat bar 38 as shown in FIGS. 1 and 2 has a generally cylindrical configuration and two ends in the form of flat tip portions 60. The seat bar 38 is pivotally mounted to respective side posts 28 at axially aligned points so that the seat bar 38 rotates about a generally horizontal axis. Each flattened tip portion 60 is provided with an opening therethrough that is alignable with horizontally aligned openings in respective outer side walls 29 of each side post 28. A bolt 58 for each of the side posts 28 is inserted through the respective aligned openings in associated side walls 29 and tip portions 60 and is secured by an associated nut 59 to provide the pivotal mounting of seat bar 38 on skid-steer loader 20.

The seat bar 38 includes an elongated middle portion 42 between two integrally connected end portions 40. As shown in FIG. 1 the seat bar 38 has a raised entry-egress position 50 shown in dotted lines and a lower operator protect position 52 shown in solid lines. The middle portion 42 of seat bar 38 encircles and serves as an arm rest for the operator when the seat bar is in its lowered position. The middle portion 42 has a resilient outer surface for operator comfort and safety. It should be noted that the exact configuration and mounting of the seat bar may be modified as desired and still stay within the scope of the present invention as long as the seat bar has operator protect and operator entrance-egress positions.

Each of the end portions 40 of seat bar 38 include a first section 43, a second section 45 and a third section 48. Each first section 43 has at its terminal end the above discussed tip portion 60 and is separated from second section 45 by a first bend 44 so that each of the first sections include a respective tip portion 60 and extend to a respective first bend 44. Each of the respective second and third sections are separated by a second bend 46 so that each of the second sections 45 are between the first bend 44 and second bend 46. A contact surface in the form of a looped rod 68 is rigidly attached to the bottom of each second bend 46. See FIG. 2. Each of the third sections 48 are integrally connected with the middle portion of seat bar 42 at third bend 47 so that each of the third sections 48 are between the second bend 46 and third bend 47.

Figure 3:
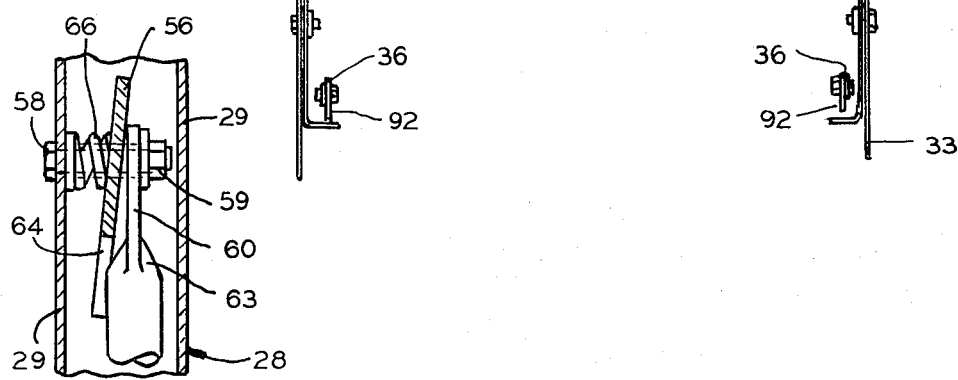
FIG. 3 is a detailed view of the detent mechanism employed to secure the restraint bar in a selected position.

A detent mechanism 54 is associated with each tip portion 60 for retaining the seat bar 38 in the position selected by the operator but may be manually overridden by the operator when he desires to change the position of the seat bar 38. Each detent mechanism 54 includes a wing plate member 56 that is provided with a downwardly disposed curved surface 64 and a generally horizontal ledge surface 65, see in FIG. 1. Each wing plate member 56 has an opening therethrough for mounting on the bolt 58 between the side wall 29 containing the bolt opening and the tip 60. Each wing plate member 56 is biased toward the associated flattened tip portion 60 by a coil spring 66 externally mounted on the bolt 58 and sandwiched between the above-mentioned side wall 29 and the wing plate member 56, all as shown in FIG. 3. A cylindrical portion 63 of each first section 43 adjacent each tip portion 60 is received in the respective curved surface 64 of the associated wing plate member 56 when the seat bar is in its lowered position 52. The cylindrical portion 63 abuts the ledge surface 65 of wing plate member 56 when the seat bar is in its raised position 50.

A locking member 70 is slidably mounted to the frame 33 of the skid-steer loader 20 on each side of the operator seat 26. Each locking member 70 includes an upwardly disposed elongated bar portion 74 having a rectangular configuration. Each of the bar portions 74 is provided with upper and lower longitudinal slots 82. Upper and lower projecting bolt ends 80 are attached to and inwardly extend from the frame 33 of the skid-steer loader 20 below and to the front of the operator's seat 26 as viewed in FIG. 1. The projecting bolt ends 80 are received in the slots 82 so that respective members 70 are slidably mounted for vertical movement on respective pairs of the bolt ends 80. A washer 81 and nut 83 are also mounted on each pair of projecting bolt ends 80 behind the associated locking member 70 for securing it to the frame 33. A block portion 76 is provided with a top contact surface 72 and is integrally connected with the upper end of each locking member 70. Each block portion 76 is internally hollow and receives a spring 78 that acts between the hollow internal portion of block 76 and a respective horizontal shelf portion 35 of the frame 33 on either side of operator seat 26. See FIG. 2. It should be noted that the length of the slots 82 limit the upward and downward movement of locking member 70. The lower end 90 of locking member 70 is bent inwardly at a 90 degree angle towards the associated control linkage 36. The locking member lower end 90 presents an outer end surface in the form of a notch 84.

When the seat bar 38 is in its raised operator entry-egress position 50 the locking member 70 is upwardly biased by the action of the spring 78 so that the notch 84 of the lower end 90 of locking member 70 is urged into wedging engagement with the wedge shaped projection 86 rigidly attached to each control linkage 36 so that the respective control linkages are placed in a locked position as shown in FIG. 4. However, the control linkage 36 in the FIG. 5 position can be moved by operator manipulation of the foot pedal 34. The seat bar 38 in its lowered operator protect position 52 positions the respective looped rods 68 in contact with the top surfaces 72 of top blocks 76. The locking members 70 are then downwardly shifted so that the lower ends 90 are moved to a position below the associated projections or tabs 84 all as shown in FIGS. 1, 2 and 5. In this illustrated position the operator is free to manipulate the foot pedals 34 and thus raise or lower the boom arms or tilt the bucket of the skid-steer loader.

The scope of this invention is not limited to the illustrated locking member which can be modified to conform with the type of seat bar utilized, the type of control linkages utilized, the location of the control linkages in the loader, and the space available on the frame to mount the locking members. Moreover, although only a skid-steer loader safety feature was described in detail it would be readily apparent to one skilled in the art how this type of safety feature can be readily adapted to other types of front end loaders.

From the foregoing it is believed that those familiar with the art will readily recognize and appreciate the novel concepts and features of the present invention. Numerous variations, changes and substitutions of equivalents will present themselves from persons skilled in the art and may be made without necessarily departing from the scope and principles of this invention. As a result, the embodiment described herein is subject to various modifications, changes and the like, with the scope of this invention being determined solely by reference to the claims appended hereto.

What is claimed is:

1. A loader including:
   a power operated working implement;
   a pedal operated, hydraulically controlled apparatus having a plurality of operative positions for supplying power to the working implement, said apparatus having at least one link connected between the pedal and an associated hydraulic control mechanism and said apparatus biased to a neutral position where power is not supplied to the working implement, the control apparatus capable of manipulation by the operator of the loader for placing the control apparatus in any one of the operative positions or the neutral position;
   an operator restraint member having an engaged position for securing the operator in the loader during operation and a disengaged position for releasing the operator to permit him to leave the loader; and
   means in operative cooperation with the apparatus link connecting the pedal and the hydraulic control mechanism and with the restraint member for locking the control apparatus in the neutral position when the operator restraint member is in its disengaged position.

2. The loader as claimed in claim 1 wherein the restraint member includes a U-shaped bar having two end portions and a middle portion spaced between and integrally connected to the end portions, the middle portion being adjacent to the operator when the restraint member is in its engaged position.

3. The loader as claimed in claim 2 wherein the middle portion has a resilient outer surface.

4. The loader as claimed in claim 2 further comprising a cab portion having a front opening for operator entrance and egress and a cab seat for the operator is located in the cab portion and wherein each of the end portions of the bar is pivotally connected to the cab portion about a horizontal axis so that when the restraint member is in its disengaged position the middle portion of the bar is in a raised position, and when the restraint member is in its engaged position the middle portion of the bar is in a lower position adjacent to the operator position.

5. The loader as claimed in claim 1 wherein the locking means includes a selectively actuated slideable locking member, the locking member having two positions, a first or upper position and a second or lower position, the locking member being movable in its first or upper position when the control apparatus is in a neutral position and the restraint member is in its disengaged position, the locking member being movable to its second or lower position when the restraint member is in its engaged position, the locking member is engaged with the control apparatus in its first position to lock the control apparatus in the neutral position and prevent it from being moved to an operative position and the locking member in its second position is disengaged from the control apparatus so that the operator can place the control apparatus in an operative position.

6. The loader as claimed in claim 5 wherein the restraint member includes a surface out of contact with the locking member when the locking member is in its first position and in contact with the locking member when the locking member is in its second position.

7. The loader as claimed in claim 6 wherein the locking member is biased towards its first position.

8. The loader as claimed in claim 5 further comprising a first element having outwardly projecting wedging surfaces and a second element having an opening for selectively receiving the first element in wedging engagement, one of the elements being operatively connected with the control apparatus and the other of the elements being operatively connected with the locking member, the elements being in locking engagement when the locking member is in its first position and being disengaged when the locking member is in its second position.

9. The loader as claimed in claim 8 wherein the first element is connected with the control apparatus and the second element is connected with the control apparatus.

10. The loader as claimed in claim 5 in the form of a skid-steer loader and including an additional control apparatus and associated locking member, the locking members being spaced apart and in operative engagement with the control apparatus and the restraint member.

11. The loader as claimed in claim 1 or 5 further comprising detent apparatus operably associated with the restraint member for retaining the restraint member in the position selected by the operator.

12. The loader as claimed in claim 11 wherein the detent apparatus includes a spring biased latch member having a downwardly curved section which receives a portion of the restraint member when the restraint member is in its engaged position and having a ledge portion which is positioned below and supports the restraint member when the restraint member is in its disengaged position whereby the restraint member will remain in the selected operative position until the operator purposefully moves the restraint member to the other selected position.

13. A skid-steer loader including:
   a power operated working implement;
   a pedal operated, hydraulically controlled apparatus including a control linkage having a link connected between the pedal and an associated valve control center, said linkage having a plurality of operative positions for supplying power to the working implement and said linkage biased to a neutral position where power is not supplied to the working implement, the control linkage capable of manipulation by the operator of the skid-steer loader for placing the control linkage in any one of the operative positions or the neutral position, the link carries at an intermediate portion thereof outwardly projecting wedging surfaces;
   an operator restraint member having an engaged position for securing the operator in the loader during operation and a disengaged position for releasing the operator to permit him to leave the loader;
   a slideable locking member in operative cooperation with the link connecting the pedal and the valve control center and with the restraint member, the slideable locking member having two operative positions, the slideable locking member being placed in its first operative position when the control apparatus is in a neutral position and the restraint member is in its disengaged position, the locking member being placed in its second position when the restraint member is in its engaged position, the locking member having an opening for selectively receiving the wedging surfaces of the control apparatus in wedging engagement, the control apparatus wedging surfaces and the locking opening being in locking engagement when the locking member is in its first position and being disengaged when the locking member is in its second position; and the restraint member including a surface which is out of contact with the locking member when the locking member is in its first position and which is in contact with the locking member when the locking member is in its second position.

* * * * *